United States Patent
Florek

[15] 3,680,246
[45] Aug. 1, 1972

[54] FISHING RIG

[72] Inventor: Louis A. Florek, 1251 Peony Lane, Wayzata, Minn. 55391

[22] Filed: Aug. 6, 1970

[21] Appl. No.: 61,671

[52] U.S. Cl. .................43/42.19, 43/43.15, 43/44.2
[51] Int. Cl. ...A01k 83/06, A01k 85/04, A01k 95/00
[58] Field of Search......43/42.19, 43.15, 4, 4.5, 42.3, 43/44.2, 44.4, 44.6, 44.8

[56] References Cited
UNITED STATES PATENTS

| | | | |
|---|---|---|---|
| 2,660,827 | 12/1953 | Pero | 43/42.19 |
| 520,594 | 5/1894 | Harlow | 43/42.19 |
| 1,467,116 | 9/1923 | Reekers | 43/42.19 |

FOREIGN PATENTS OR APPLICATIONS

| | | | |
|---|---|---|---|
| 1,101,158 | 4/1955 | France | 43/42.19 |

*Primary Examiner*—Samuel Koren
*Assistant Examiner*—Daniel J. Leach
*Attorney*—Carlsen, Carlsen & Sturm

[57] ABSTRACT

A rig for attaching a live frog to a fishing line comprising a leader formed of a single length of monofilament line having a sinker mounted on one end, a hook means on the other end, and a spinner mounted at an intermediate position thereon. The hook means has two integrally related hooks extending in diametrically opposing directions on a common vertical plane to facilitate impaling the rear end portion of the body of the frog on the lower hook with the other hook extending upwardly over said body portion leaving the head and frontal body portion of the frog free.

4 Claims, 4 Drawing Figures

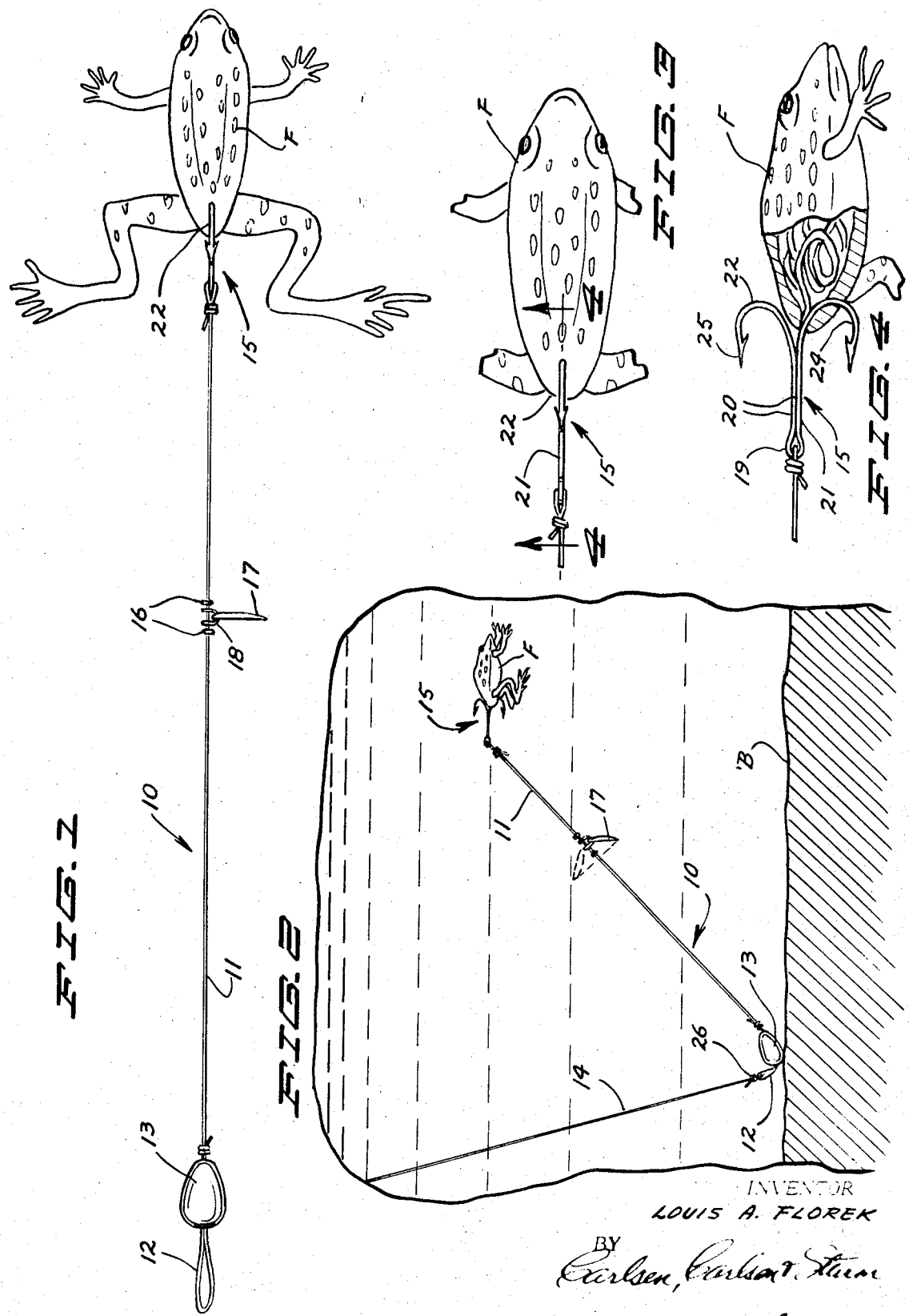

3,680,246

FISHING RIG

BACKGROUND OF THE INVENTION

This invention relates generally to inland fishing apparatus and particularly to rigs, as distinguished from lures. More particularly the invention concerns an apparatus for attaching a live frog to a fishing line in such a manner as to leave the frog in such a condition as to be more attractive to certain fresh water fish such as walleyed pike, northern pike, bass or the like.

Various types of apparatus and methods have been used for attaching live frogs to fishing lines and hooks carried thereby for the purpose of catching fish such as pike or bass which are attracted to this type of bait. Such fish may be caught by trolling, casting or still-fishing. Generally, such apparatus in the past have provided either a harness for the frog or a hook device for hooking the frog through the mouth. These devices, however, tend to weight the frog down or restrict it from swimming in a normal manner.

SUMMARY OF THE INVENTION

It is an objective of the present invention to provide a rig for attaching a frog to a fishing line which leaves the frog free to swim in a natural upwardly facing position in concentric circles about the line so as to be attractive to frog eating fish in the area.

WIth this and other objects in mind the rig broadly comprises a leader having a weight at one end, a spinner on the central portion, and a hook device at the other end having a pair of hooks formed on a common plane and projecting in diametrically opposite directions permitting one hook to be inserted downwardly through the central rear portion of the frog while the other hook projects upwardly thereover allowing the entire front portion and the rear legs of the frog to be free for swimming action.

BRIEF DESCRIPTION OF THE DRAWING

In the drawing:
FIG. 1 is a plan view of the rig.
FIG. 2 is a pictorial view of the position of the rig and bait in normal use during the fishing operation.
FIG. 3 is an enlarged fragmentary plan view of the hook impaled in the frog.
FIG. 4 is a longitudinal vertical section taken on line 4—4 of FIG. 3.

DESCRIPTION OF THE PREFERRED EMBODIMENT

Referring now more particularly to the drawings reference characters will be used to denote like parts or structural features in the different views. The rig is denoted generally by the numeral 10 and comprises a leader 11 formed from a single section of monofilament line. The leader has a loop 12 tied at one end for attaching the leader to the end of a fishing line 14 (FIG. 2). At its other end leader 11 is connected to a hook device, denoted generally at 15 and to be subsequently described in detail.

A pair of knots 16 are tied at closely spaced points in the leader and nearer to the device 15 than to the loop 12. A spinner 17 is mounted as by a ring 18 on the leader between knots 16 for swivel movement around the leader and limited sliding movement between the knots. Spinner 17 has a bright or shiny color to attract the attention of fish as it swivels.

While the length of the leader 11 may vary, the most practical length is found to be between 1 and 2 feet and preferably about 18 inches. The spinner is located closer to the hook device 15 than to loop 12. It may be from 3 to 6 inches from the hook device 15 and preferably about 4 inches. Just inside of the loop 12 a bell-type sinker 13 is mounted in fixed position on the leader.

The hook device 15 is formed of a single length of tempered steel wire having a loop 19 formed in the middle thereof to facilitate attachment of the device to the leader. The wire portions 20 at each side of loop 19 extend outwardly therefrom in parallelism to form a shank 21 and the terminals curl outwardly in diametrically opposite directions on a common plane to form upper and lower hooks 22 and 24 each being provided with barbs 25. While not essential, the wire portions 20 are here shown welded together to form a unitary inflexible shank 21 to hold the hooks 22 and 24 in relatively fixed positions.

As hereinbefore indicated the rig is designed for attaching a live frog F to the submerged end of a fishing line 14. The rig is connected to line 14 as by a clasp or knot 26 secured to loop 12. The frog is impaled on the hook device by inserting the lower hook forwardly through the rectal opening in the frog and then downwardly through the lower portion of the belly just forward of the hips. The lower hook 24 is thus secured in the longitudinal vertical center plane of the frog with its barbed portion projecting downwardly in the form of a rudder while the upper hook curls upwardly in the same plane over the rear end of the frog in the form of a fin. When so hooked the frog is not crippled in any way against using its normal swimming stroke.

In use of the rig the frog is impaled on the hook in the manner above described and the rig is lowered into the water to a suitable depth as shown in FIG. 2. The line may be lowered until the sinker 13 rests on the lake bottom if desired. The frog F will tend to swim upwardly away from the bottom and in circles around the line L and sinker. As this occurs the spinner 17 will swivel around the leader attracting fish toward the swimming frog. With the frog hooked in this manner he will stay off of the bottom. When hooked through the mouth a frog will tend to go downwardly and crawl along the bottom pulling the sinker with him away from the spot intended to be fished.

Fish tend to attack the frog in an upright position with the hooks 22 and 24 lying on a vertical plane. Accordingly, as the fish's mouth closes down on the frog, hooks 22 and 24 will respectively sink into the upper and lower jaws of the fish. Even though the lower hook 24 should become embedded in the body of the frog the upper hook will always project upwardly to hook the upper jaw. While the hook device is formed of a single length of wire it is preferable that portions 20 be secured together to prevent any yielding movement between the hooks.

Having now therefore fully illustrated and described my invention, what I claim as new and desire to protect by United States Letters Patent is:

1. A rig for attaching a live frog to a fishing line comprising a leader formed of a single length of monofilament line having a loop formed at one end for attaching the fishing line thereto, a hook means secured to the other end of the leader, a sinker mounted in fixed position on the leader just inside of the loop, a spinner mounted for spinning movement around the leader at a point intermediate the sinker and hook means but closer to the hook means, and said hook means comprising a wire shank having a pair of barbed hooks extending outwardly in diametrically opposing directions from the shank, one hook of said pair of barbed hooks being inserted forwardly through the rectal opening of the frog and then downwardly through the lower portion of the belly, the other hook being disposed vertically over the rear end of the frog.

2. The subject matter of claim 1 wherein a pair of closely spaced knots are provided in the monofilament line with the spinner mounted therebetween for limited sliding movement along the leader.

3. The subject matter of claim 1 wherein said leader is between one and two feet in length and said spinner is located between three and six inches from the hook means.

4. The subject matter of claim 1 wherein said hook means comprises a single length of wire with a loop formed in its center with the portions at each side of the loop extending in parallelism to form the shank and with the end portions thereof curling outwardly on a common plane to form the hooks.

* * * * *